Figure 1:
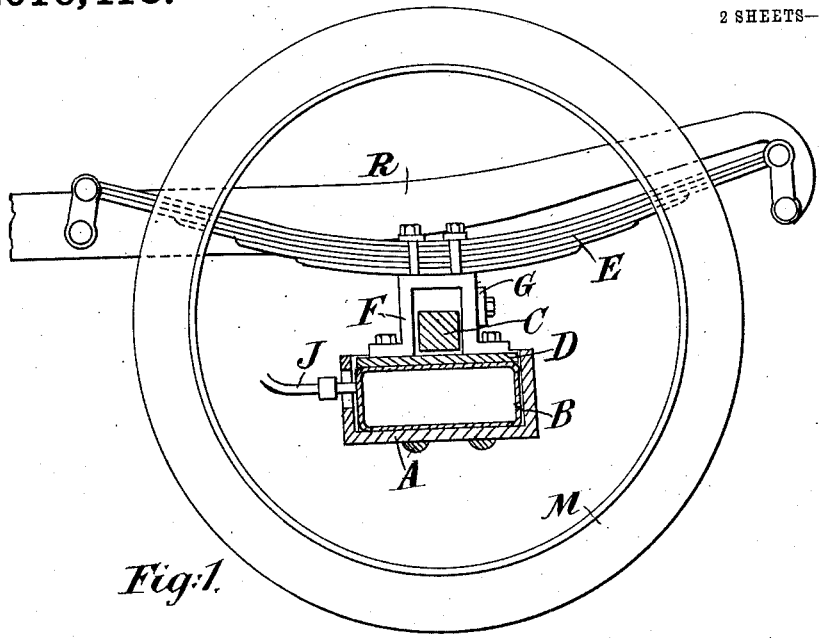

W. KNEEN.
PNEUMATIC SUSPENSION FOR VEHICLES.
APPLICATION FILED JULY 9, 1910.

1,016,418.

Patented Feb. 6, 1912.
2 SHEETS—SHEET 1.

Witnesses:

Inventor:
William Kneen,
by Frank S. Ammerman.
atty.

W. KNEEN.
PNEUMATIC SUSPENSION FOR VEHICLES.
APPLICATION FILED JULY 9, 1910.
1,016,418.
Patented Feb. 6, 1912.
2 SHEETS—SHEET 2.
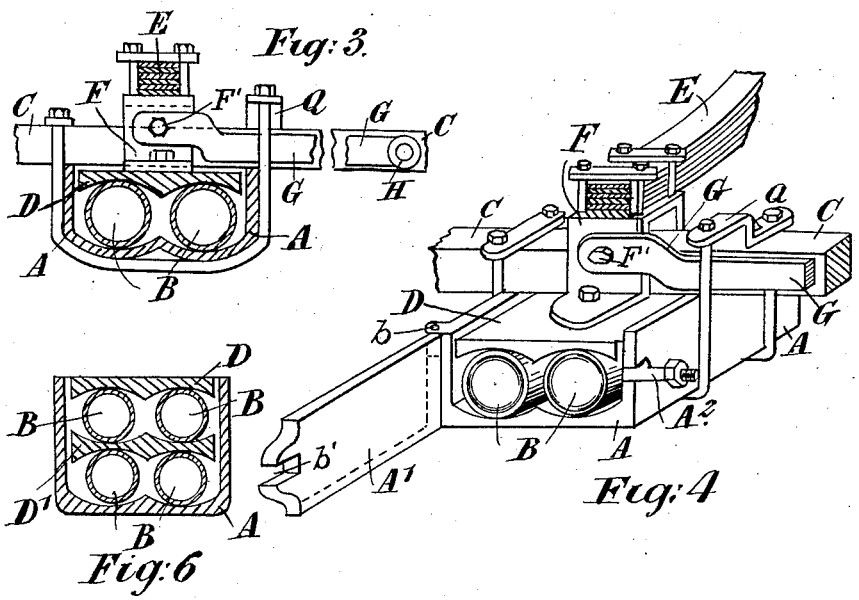
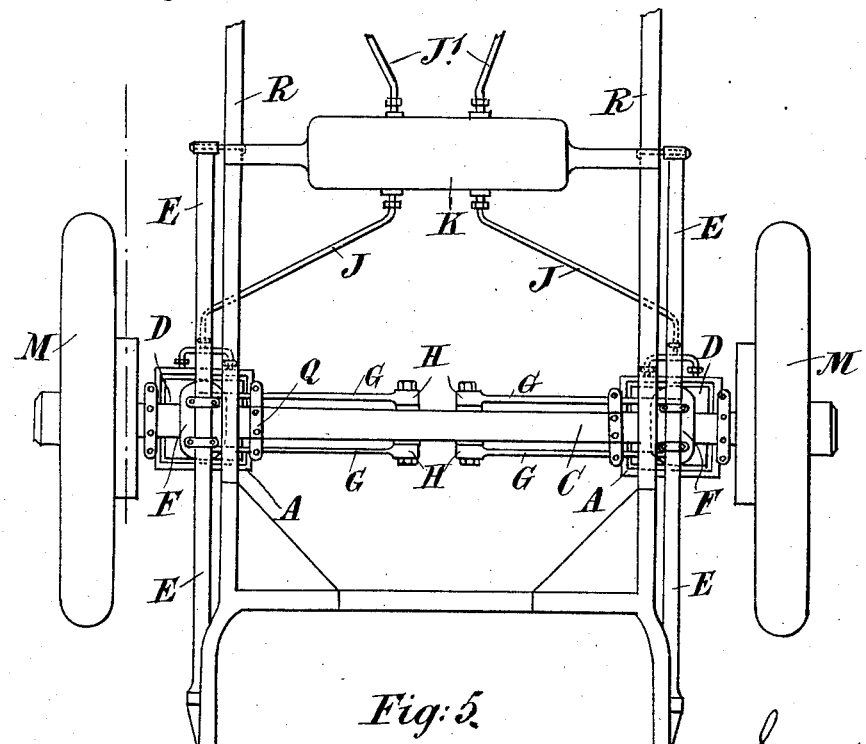

UNITED STATES PATENT OFFICE.

WILLIAM KNEEN, OF LONDON, ENGLAND.

PNEUMATIC SUSPENSION FOR VEHICLES.

1,016,418.       Specification of Letters Patent.     Patented Feb. 6, 1912.

Application filed July 9, 1910. Serial No. 571,193.

*To all whom it may concern:*

Be it known that I, WILLIAM KNEEN, a subject of the King of Great Britain, and a resident of 81 Turnmill street, London, E. C., England, have invented a new and useful Pneumatic Suspension for Vehicles, of which the following is the specification.

My invention relates to pneumatic suspension, and shock absorbers for vehicles, and has for its object the reduction of vibration in connection with motor cars or the like.

A further object is to provide a device for the purpose stated, that is comparatively simple and economical in points of construction and maintenance, and that is efficient and thoroughly practical in operation.

I attain the foregoing objects by the mechanism illustrated in the accompanying drawings, in which similar reference characters designate similar parts throughout the several views, and in which:—

Figure 2:
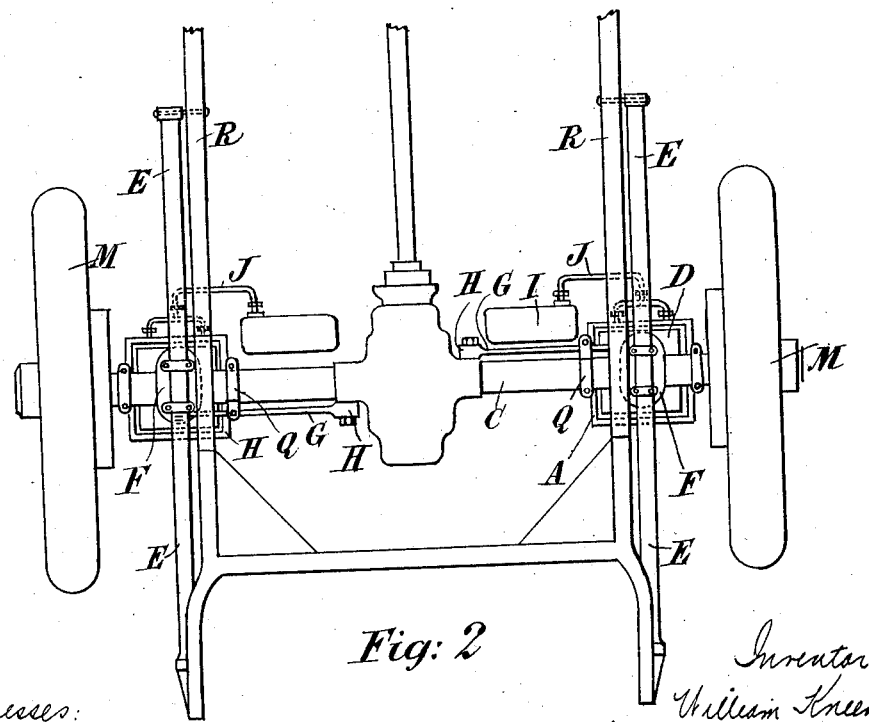

Figure 1 shows a vehicle spring having one form of embodiment of my invention connected therewith, as shown in section, and in which a vehicle wheel M is indicated in outline. Fig. 2 shows, in plan, a portion of a vehicle to which a form of my invention is secured. Fig. 3 is a detail view, in section, of a modified form of my invention. Fig. 4 is a perspective detail view of the form shown in Fig. 3. Fig. 5 is a plan view of a portion of a vehicle frame embodying a modified form of my invention, and Fig. 6 illustrates a sectional detail of another modification.

In these drawings, A designates the pneumatic casing containing the pneumatic tube or tubes B, only one of which is shown in Fig. 1. The casing A is rigidly fixed to the axle C by means preferably of clip bolts.

R designates the vehicle frame and M designates a wheel thereof. The cover or top plate D of the casing A is fixed to the spring E by means of brackets of channel section F and is vertically reciprocable in said casing. The said channel section brackets also form a guide between which the axle is adapted to reciprocate vertically. The bracket guides F are bolted to the top of the plate D by means of right angle lugs, as shown in Figs. 1 and 2. The lever arm G is pivoted at one end on a pin H secured at any suitable point on the axle, if a dead axle, or on the axle casing, if a live axle. The other end of the lever G is secured to the channel guide bracket F at F'.

I is a subsidiary air reservoir to which the pneumatic tubes B are connected by the flexible pipe J. This reservoir is designed to hold a supply of air, under pressure, for supplying air to the respective cushions in case of leakage therefrom.

The casing A is provided with a gate A', for gaining easy access to the pneumatic cushions B, in case of necessary repairs thereto or a replacement thereof. This gate is hinged at $b$, and is provided with a slot $b'$, adapted to engage a bolt $A^2$, which latter carries a nut for securing said door in its closed position. This door opens on a horizontal plane and therefore, any one of the cushions may be removed and replaced without disturbing other of the cushions. The clip plate Q for securing the box or casing A to the axle is formed with a bend so as to permit the vertical oscillation of the lever arm G.

Fig. 5 shows an arrangement wherein the pneumatic tubes B in the casings A are connected by their flexible pipes J to one central reservoir of air K. In like manner as indicated by the broken pipes J', the pneumatic tubes B if applied also to the front axle, may be connected to the central air reservoir K.

Where cylindrical air tubes are employed, as in Figs. 4, 5 and 6, the bottom of the casing and the underside of the cover are preferably concaved as shown; and where 4 or more such cylinders are employed as in Fig. 6, a horizontally disposed, preferably concaved, separating plate D' is employed. This invention is obviously susceptible to many modifications, without departure from the spirit thereof, and consequently is not limited to the exact construction here shown and described.

What I claim as my invention and desire to secure by Letters Patent is:—

1. A vehicle including an axle, a spring, a casing suspended under said axle by means of clips and clip bolts, an air containing cushion in said casing, a vertically reciprocable cover on said cushion and having a guide for said axle secured thereon, said guide constituting a support for said spring, an arm secured to said guide and pivoted to said axle, one of said clips having an upwardly bent portion for allowing relative movement of said arm.

2. A vehicle including air-containing cushions, tubular connections between said air-containing cushions, casings receiving certain of said air-containing cushions, resilient members secured to said vehicle, means for suspending said casings from the vehicle axle, closures for said casings, means for suspending said closures from said resilient members, and arms pivoted to said vehicle axle and connected to said closure suspending means.

WILLIAM KNEEN.

Witnesses:
H. W. JAMESON,
A. NUTTING.

Copies of this patent may be obtained for five cents each, by addressing the "Commissioner of Patents, Washington, D. C."